United States Patent

[11] 3,565,057

[72] Inventor John T. Hart
 Newtonville, Mass.
[21] Appl. No. 781,727
[22] Filed Dec. 6, 1968
[45] Patented Feb. 23, 1971
[73] Assignee Hewlett-Packard Company
 Palo Alto, Calif.
 a corporation of California

[54] SIGNAL ANALYZING APPARATUS FOR AN ULTRASONIC SCANNING SYSTEM
 1 Claim, 6 Drawing Figs.
[52] U.S. Cl...................................................... 128/2.05,
 73/67.7
[51] Int. Cl....................................................... A61b 5/10,
 A61b 5/02; G01n 23/20
[50] Field of Search........................................... 128/2.05;
 73/67.7, 67.8, 67.9

[56] References Cited
 UNITED STATES PATENTS
3,260,105 7/1966 McNulty...................... 73/67.9

3,280,622 10/1966 Carlin.............................. 73/67.9
3,334,622 8/1967 Brech.............................. 128/2
3,427,866 2/1969 Weighart....................... 73/67.9X Primary Examiner—Richard A. Gaudet
Assistant Examiner—Channing L. Pace
Attorney—A.C. Smith ABSTRACT: Ultrasonic scanning apparatus for analyzing a group of echo signals occurring over a period of time to provide an output signal related to the time location of the echo signal of relatively greatest amplitude within the period is disclosed. The group of echo signals are supplied to a peak detector and differentiator circuit which supplies an intermediate signal to reset an integrator whenever the amplitude of any echo signal exceeds the amplitude of all previous echoes within the period. The amplitude of the signal stored on the integrator at the end of the period is thus proportional to the time between the echo signal of greatest amplitude and the end of the period.

PATENTED FEB 23 1971

INVENTOR
JOHN T. HART

BY  Q. C. Smith

ATTORNEY

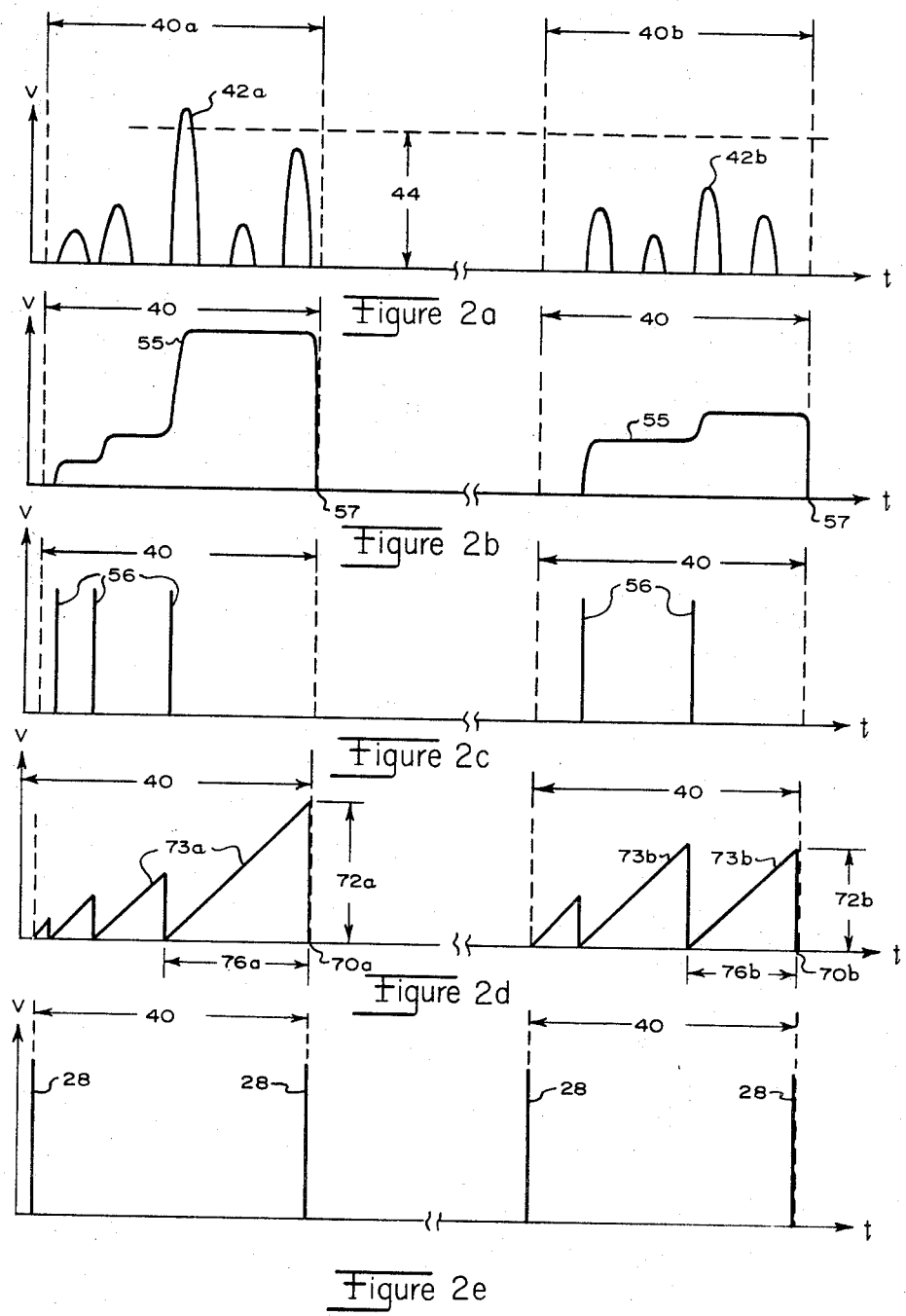

SIGNAL ANALYZING APPARATUS FOR AN ULTRASONIC SCANNING SYSTEM

BACKGROUND OF THE INVENTION

In ultrasonic scanning, to observe the motion of a selected portion of the human body, a series of ultrasonic pulses are generated into a body and the echo signals returning from the body during a specific period of time are analyzed. In observing, for example, the echoes returning within a selected period of time from a selected depth within the human heart, it is often desirable to observe the motion of the single largest echo within the period since this echo may represent a vital portion of the heart, for example, the mitral valve. The time location of the largest echo within the period will indicate the motion of this valve within the heart cavity, since the ultrasonic pulse and its related echo travel at a known velocity through the body and an echo returning sooner will indicate that the reflecting surface of the heart valve has moved closer to the pulse source at the surface of the body.

However, it is not easy to detect this echo of relatively greatest amplitude when several pulses are generated in succession since the background level and absolute amplitude of this echo may vary greatly with each different group of echoes returning from each pulse. The conventional use of level-detecting devices such as a schmitt trigger may be ineffective as it is not always possible to choose a suitable amplitude discrimination level above which only the echo of greatest amplitude in each group of returning echoes will pass.

SUMMARY OF THE INVENTION

In accordance with the illustrated embodiment of the invention, apparatus is provided which gives an accurate indication of the motion of a selected echo signal reflected from a moving body being scanned. A transducer is placed near the body under test and is electrically excited to transmit ultrasonic pulses into the body. A receiver connected to the transducer will detect the echo signals reflected from a selected portion within the body, for example, from the area of the heart containing the mitral valve. Since this mitral valve is of a denser medium than the surrounding heart area, each pulse reaching it will reflect a relatively greater echo signal back toward the transducer. If, for example, the heart valve moves closer to the transducer, the echo pulse from it will appear back at the transducer sooner. Thus by closely observing the time location of this echo pulse of greatest amplitude for successive ultrasonic pulses sent into the body, the movement of the mitral valve of the heart can be accurately observed.

The group of echoes returning to the transducer within a selected period of time is gated by an electronic gate which is operated by a control signal indicative of this selected period of time. The period of time is selected to correspond with the echoes returning from a selected depth within the body. It is desired to select the individual echo pulse of greatest amplitude within the group of echoes within this period of time and to provide an output representative of the time location of this pulse within the period.

This group of echo signals is applied to a peak detector and differentiator circuit which supply intermediate signal pulses whenever the amplitude of any echo signal passing through the electronic gate exceeds the amplitude of all previous impulse signals within the period. These intermediate signals are then used to set an integrator which integrates a signal from a suitable source at a uniform rate, a new integration being started with each intermediate signal. The last intermediate signal of the period supplied by the peak detector and differentiator circuit thus indicates the time of occurrence of the largest echo signal within the period and the magnitude of the integration at the end of the period is therefore proportional to the time between the largest echo signal and the end of the period. Suitable output means set by a control pulse which indicates the end of each of the periods is provided to produce an output that is representative of the magnitude of the integration at the end of each period. By continuously supplying ultrasonic pulses to the body and analyzing a selected group of echoes from each pulse in this manner, the relative motion of the heart valve which produces the largest echoes can be observed.

DESCRIPTION OF THE DRAWINGS

FIG. 2a through e are waveform diagrams of voltages as a function of time that are present at various stages of the scanning system of FIG. 1.

DESCRIPTION OF THE PREFERRED EMBODIMENT

Figure 1:
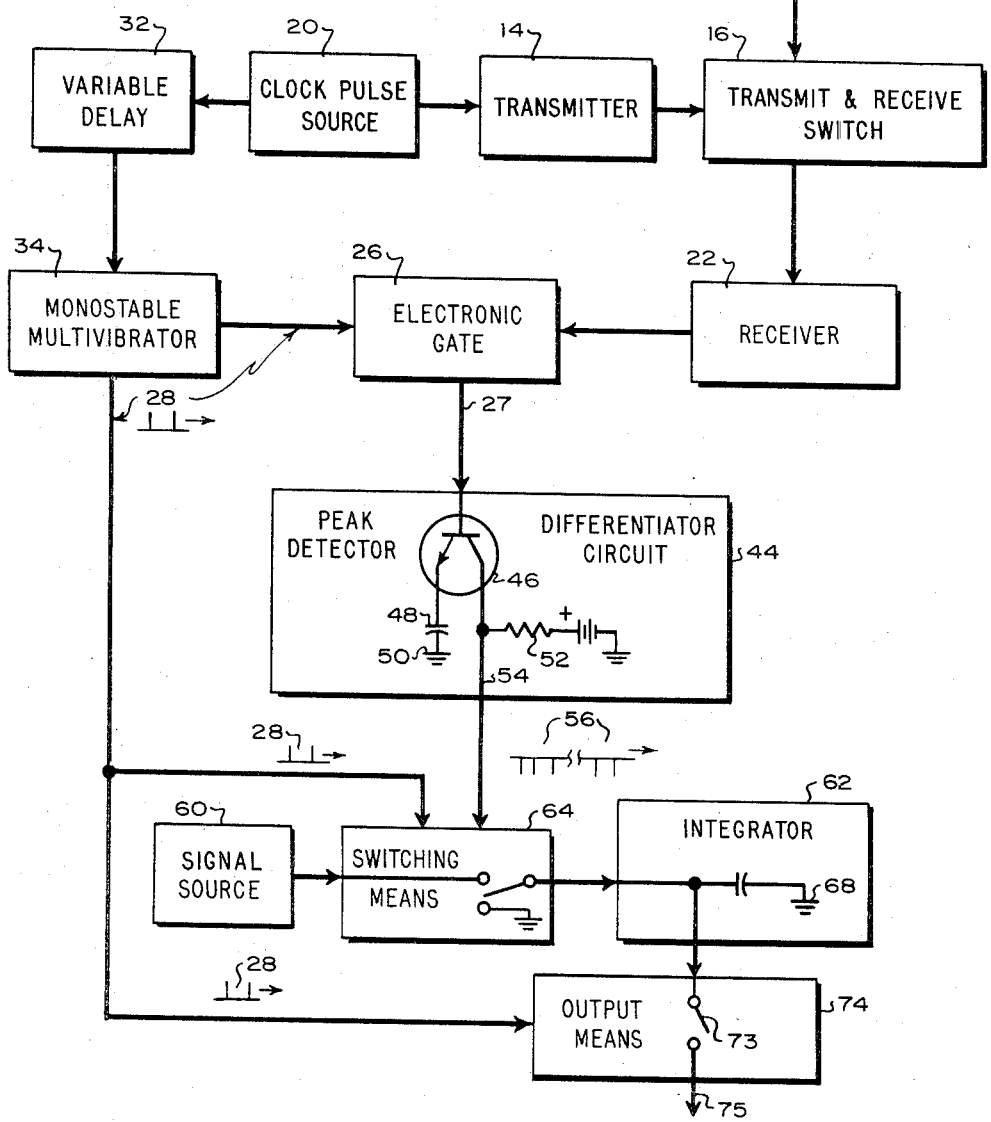
FIG. 1 is a block diagram of an ultrasonic scanning system according to the preferred embodiment of the invention.

Referring now to FIG. 1, there is shown a hand-held transducer 10 for performing a one-dimensional A scan of a body 12 under test, for example, to observe the motion of the mitral valve within a patient's heart. A transmitter 14 is connected by a transmit-and-receive switch 16 to transducer 10 for energizing the transducer with an electric pulse to transmit an ultrasonic scanning signal to the body 12 each time transmitter 14 is triggered. The transmitter is triggered periodically at a repetition rate of, for example, 500 cycles per second by a clock pulse source 20 which is connected thereto. A receiver 22 is also connected by transmit-and-receive switch 16 to transducer 10 for receiving electrical impulse signals which correspond to the ultrasonic echo signals from the body 12 that are detected by the transducer after each transmitted scanning signal.

The receiver 22 is connected to one input of an electronic gate 26 for supplying the echo signals thereto. A selected complex of echo signals reflected from a moving boundary in the patient's body 12 being scanned, such as the patient's beating heart, is electrically isolated during the scan by means of a time-controlled signal 28 which is supplied to electronic gate 26. The timing of control signal 28 during the scan is controlled by a variable delay device 32 which is connected to the clock pulse source 20 for selectively delaying the clock pulses periodically received therefrom. A device such as a monostable multivibrator 34 having a variable delay time is connected between the variable delay device 32 and the electronic gate 26 and is triggered by a delayed clock pulse to provide a control signal 28 at a selected time after each clock pulse. Thus, by controlling the variable delay device 32 and the delay time of the monostable multivibrator 34 the control pulse 28 may be supplied to the electronic gate 26 at time intervals between which only the selected echo signals occur so that only the selected echo signals will be allowed to pass through electronic gate 26.

Referring now to FIG. 2, there are shown two groups of impulse signals occurring over selected periods of time 40 a and 40 b. These groups each represent the echo signals which are received from a selected depth in body 12 and which are passed by electronic gate 26 to gate output 27. These echo or impulse signals are of varying amplitudes as illustrated. It is desired to select the individual pulses of greatest amplitude 42 a and 42 b in the group of pulses within each period of time 40 a and 40 b and to determine the time location of each of these greatest pulses within the period. However, the levels of these pulses of greatest amplitude 42 will often vary greatly, making a conventional level detection circuit such as a Schmitt trigger ineffective. It should be apparent that a trigger circuit set, for example, at the amplitude 44 to detect only the highest pulse 42 a of the group of impulses in period 40 a would not detect other pulses such as 42 b of greatest amplitude within the other group of impulses in period 40 b.

The peak detector and differentiator circuit 44 produces intermediate signal pulses whenever the amplitude of any impulse signal passing through electronic gate 26 exceeds the amplitude of all previous impulse signals within a selected period of time. This circuit 44 may comprise a conventional peak detector in series with a differentiator or may comprise a transistor 46 having only a capacitor 48 connected in the emitter circuit of the transistor, as shown in FIG. 1. When the voltage applied to the base of NPN transistor 46 is increasing due to a signal of increased amplitude passing through gate 26, transistor 46 will conduct, allowing current to flow and a charge to build up on capacitor 48, thus providing an intermediate signal pulse at intermediate output 54. Since the discharging of capacitor 48 is slow with respect to the occurrence of pulses within period 40, the capacitor retains substantially all of its charge. Thereafter, a voltage greater than the voltage appearing across capacitor 48 will be required to turn on the transistor 46 and further increase the voltage across the capacitor. Thus if the voltage on the base of transistor 46 increases to a greater value with application of an impulse signal of a greater amplitude, the transistor 46 conducts and further charges the capacitor. The current that flows through resistor 52 during each charging interval produces a voltage spike at intermediate output 54.

The action of peak detector and differentiator circuit 44 is best illustrated by referring to FIGS. 2a, b and c. FIG. 2b illustrates that the voltage builds up across capacitor 48 with each voltage pulse of increased amplitude, as shown in FIG. 2a, that passes through electronic gate 26. FIG. 2c illustrates the intermediate signal pulses 56 that are produced at intermediate output 54 with each charge buildup on capacitor 48. Conventional means may be used to discharge capacitor 48 at the end of each period to avoid a residual charge on the capacitor. Thus the voltage across capacitor 48 is discharged to zero at the end of period 40 in FIG. 3 and this discharging by conventional means may be controlled by the control signal 28 from the monostable multivibrator 34 of FIG. 1.

Referring again to FIG. 1, there is shown a source 60 of electrical signal that is capable of being intermittently connected to integrator 62 by a switching means 64. Switching means 64 is energized by each intermediate signal pulse 56 from peak detector and differentiator circuit 44 to discharge integrator 62 and to reconnect current source 60 to integrator 62 to begin a new integration cycle. Integrator 62 may comprise a capacitor 66 which is charged by the current from source 60 such that the voltage across the capacitor 66 is proportional to the length of time during which the current from source 60 was supplied. The integrator 62 is thus discharged and reconnected to the current source 60 to begin a new integration cycle upon each occurrence of an intermediate signal pulse 56 from peak detector and differentiator circuit 44.

FIG. 2d illustrates the buildup of voltage on capacitor 66 after each intermediate signal pulse 56 of FIG. 2c. Since the voltage on capacitor 66 will be proportional to the length of time of each integration cycle, the voltage at the end 70a of period 40a will be proportional to the length of time between the greatest input impulse signal, 42a of FIG. 2a, and the end of period 40a.

Output means 74 of FIG. 1 is connected to receive the voltage across capacitor 66 for producing a signal at output 75 which is proportional to the time interval 76a between the occurrence of the impulse signal 42a of relatively greatest amplitude and the end of period 40a. From observation of the events occurring within the two separate groups of impulse signals labeled a and b in FIGS. 2a through 2d, it should be apparent that the magnitudes of integrator voltages 72a and 72b are proportional to the time intervals 76a and 76b between the impulse signals 42a and of largest amplitudes within the gate periods 40a and 40b and the ends 70a and 70b of the periods, and that the proportionality relationship is constant and directly related to the slope or rate of integration (lines 73a and 73b). FIG. 2e illustrates the timing of control signals 28 from monostable multivibrator 34 which may be used to control a switch 73 within output means 74 for producing the signal at output 75 at the end of each pulse period having an amplitude that is related to the voltage 72a or 72b on integrator 62 at the end of each period 40a, 40b. These control signals 28 may also be applied to switching means 64, as illustrated in FIG. 1, to reset integrator 62 after each period 40 where it is necessary to prepare the integrator for each successive group of echo or impulse signals that occur during continuous operation.

I claim:

1. Apparatus for providing an output signal related to the time of occurrence of an impulse signal of greatest amplitude within a group of successive impulse signals occurring over a selected period of time, said apparatus comprising:

input means capable of receiving a group of impulse signals occurring within a selected period of time;

means responsive to said impulse signals for producing a threshold level proportional to the amplitude of the first impulse signal occurring within said selected period of time and for increasing said threshold level in response to each impulse signal occurring within said selected period of time having an amplitude greater than the established threshold level;

intermediate signal means for producing an intermediate signal in response to the establishment of each threshold level occurring within said selected period of time;

a source of signal;

integrator means connected to said signal source and responsive to said intermediate signals to integrate the signal from said source; and switching means connected to said integrator means for resetting said integrator means to a reference level and for initiating a new integration period in response to each of said intermediate signals to produce an output signal from said integrator means having an amplitude related to the time intervals between the occurrence of the last intermediate signal and the end of said selected period of time.